United States Patent
Uchino

(10) Patent No.: US 7,837,535 B2
(45) Date of Patent: Nov. 23, 2010

(54) SUPERFINISHING STONE AND SUPERFINISHING PROCESS USING THE SAME

(75) Inventor: Takashi Uchino, Kashiwara (JP)

(73) Assignee: JTEKT Corporation, Osaka (JP)

( * ) Notice: Subject to any disclaimer, the term of this patent is extended or adjusted under 35 U.S.C. 154(b) by 527 days.

(21) Appl. No.: 11/887,234

(22) PCT Filed: Mar. 28, 2006

(86) PCT No.: PCT/JP2006/306238

§ 371 (c)(1),
(2), (4) Date: Sep. 27, 2007

(87) PCT Pub. No.: WO2006/104130

PCT Pub. Date: Oct. 5, 2006

(65) Prior Publication Data

US 2009/0061736 A1    Mar. 5, 2009

(30) Foreign Application Priority Data

Mar. 29, 2005   (JP) .............................. 2005-095117

(51) Int. Cl.
  *B24B 49/00* (2006.01)
  *B24B 7/00* (2006.01)
(52) U.S. Cl. ................................ 451/11; 451/7; 451/53; 451/165; 451/910
(58) Field of Classification Search ................ 451/7, 451/11, 53, 66, 165, 540, 910
See application file for complete search history.

(56) References Cited

U.S. PATENT DOCUMENTS

| 3,879,897 | A | * | 4/1975 | Kato | 451/52 |
| 4,240,232 | A | * | 12/1980 | Chwae | 451/488 |
| 4,485,592 | A | * | 12/1984 | Kawaguchi et al. | 451/163 |
| 5,233,792 | A | * | 8/1993 | Suzuki | 451/160 |
| 6,726,544 | B2 | * | 4/2004 | Ozaki et al. | 451/52 |
| 2007/0010171 | A1 | * | 1/2007 | Klotz | 451/11 |
| 2008/0318498 | A1 | * | 12/2008 | Gustafsson et al. | 451/164 |

FOREIGN PATENT DOCUMENTS

| JP | 60-9655 A | | 1/1985 |
| JP | 62-74964 U | | 5/1987 |
| JP | 3-130367 U | | 12/1991 |
| JP | 05269671 A | * | 10/1993 |
| JP | 5-329780 A | | 12/1993 |
| JP | 6-134674 A | | 5/1994 |
| JP | 8-126954 A | | 5/1996 |
| JP | 10-180612 A | | 7/1998 |
| JP | 2002-326153 A | | 11/2002 |
| JP | 2003-71702 A | | 3/2003 |
| JP | 2003-260650 A | | 9/2003 |
| JP | 2004-322307 A | | 11/2004 |

* cited by examiner

*Primary Examiner*—Maurina Rachuba
(74) *Attorney, Agent, or Firm*—Birch, Stewart, Kolasch & Birch LLP

(57) ABSTRACT

A superfinishing stone 2 is slid on a rotating subject surface 7 as pressed against the subject surface 7 and is held in contact against the subject surface 7 as vibrated thereon in a different direction from the sliding direction. The superfinishing stone includes plural stone portions 3, 4 divided by a split surface 6 inclined to both the sliding direction and the vibrating direction and mutually independently movable along the split surface 6 and in the pressing direction.

20 Claims, 4 Drawing Sheets

SUPERFINISHING STONE AND SUPERFINISHING PROCESS USING THE SAME

TECHNICAL FIELD

The present invention relates to a superfinishing stone and a superfinishing process using the same. More specifically, the invention relates to a superfinishing process wherein the superfinishing stone is pressed against a subject surface of a work moved relative to the superfinishing stone and is also finely vibrated in a different direction from the pressing direction, as well as to a superfinishing stone employed by the process.

BACKGROUND ART

It has been a conventional practice to use the superfinishing process to finish a crown surface (hereinafter, also referred to as "CR surface") of a cylindrical roller bearing, a tapered roller bearing or the like.

As disclosed in Japanese Unexamined Patent Publication No. 2002-326153, for example, the superfinishing process is performed as follows. A tip of the superfinishing stone is pressed against an inner peripheral surface (subject surface) of an outer ring or an outer peripheral surface of an inner ring rotated about its center axis, so as to be slid on the inner peripheral surface or outer peripheral surface. In the meantime, the superfinishing stone is vibrated (oscillated) in a different direction from the sliding direction. The superfinishing stone is disposed in a manner to incline to a perpendicular to a raceway surface of the outer ring or inner ring and toward an outer side of a diametrically greater opening. Thus is avoided interference between a rear end portion of the superfinishing stone and a non-subject raceway surface opposite from a subject raceway surface (on which the tip of the superfinishing stone is slid). This permits the superfinishing stone to be increased in the longitudinal length thereof, so that the frequency of replacement of the superfinishing stone may be reduced.

DISCLOSURE OF THE INVENTION

Problem to Be Solved by the Invention

Unfortunately, however, the superfinishing stone set forth in Japanese Unexamined Patent Publication No. 2002-326153 consists of a single stone material. As schematically shown in FIG. 3 and FIG. 4, therefore, a phenomenon occurs wherein either of the crowning portions 11a at opposite ends of a superfinishing stone 11 (opposite ends with respect to the vibrating direction of the superfinishing stone) runs on a flat face 12 during the vibrations of the superfinishing stone 11 so that the superfinishing stone 11 fails to reach a deeper portion or a trench portion 13 of the crowning configuration. More specifically, indicated at 14 in FIG. 3 and FIG. 4 is an inner ring rotated by an unillustrated rotary mechanism. The superfinishing stone 11 is pressed against a CR surface on an outer peripheral surface of the inner ring 14 (see Arrow A), whereby an abrasive surface 11b at a tip of the superfinishing stone 11 is slid on the CR surface. On the other hand, the superfinishing stone 11 is vibrated in a different direction (see Arrow B) from the sliding direction. As the trench portion 13 of the crowning configuration is increased in depth while the crowning portions 11a are accordingly increased in the height of projection from the abrasive surface 11b, the crowning portion 11a runs on the flat face 12 so that the superfinishing stone 11 moves away from the subject surface (the superfinishing stone is shifted in the opposite direction to the direction of Arrow A). In this case, although the force vibrating the superfinishing stone 11 is applied in the direction indicated by Arrow B, an actual path of movement of the superfinishing stone 11 is deflected, as indicated by Arrow C, so that the superfinishing stone moves away from the CR surface at opposite ends of amplitude of the vibrations of the superfinishing stone 11. As a result, the superfinishing stone does not reach the trench portion 13 of the crowning configuration, failing to accomplish the superfinishing process. What is more, a corner portion 15 of the CR surface near a boundary between the flat face 12 and the trench portion 13 is excessively superfinished, resulting in a deformed crowning configuration.

In view of the foregoing, the invention seeks to provide a superfinishing stone capable of uniformly superfinishing the overall CR surface of a deep crowning configuration without deforming the crowning configuration and to provide a superfinishing process using the same.

Means for Solving the Problem

According to the invention, there is provided a superfinishing stone designed to be pressed against a subject surface and slid on the subject surface as relatively moved thereon and to be vibrated on the subject surface in a different direction from the sliding direction, wherein the superfinishing stone includes a plurality of stone portions which are divided by a split surface inclined to both the sliding direction and the vibrating direction and which are mutually independently movable along the split surface and in the pressing direction (Claim 1).

According to the invention, there is also provided a superfinishing stone for curved-surface working having an abrasive surface which is vibrated along a curved surface as pressed thereagainst and which is movable in the pressing direction depending on the height variations of the curved surface, wherein the superfinishing stone includes a combination of plural stone portions which are divided by a split surface inclined to the vibrating direction and are movable along the split surface and in the pressing direction, and the individual ones of the plural stone portions are mutually independently free to move (Claim 2).

According to the superfinishing stone of the invention, the superfinishing stone pressed against the subject surface includes the plural stone portions, the individual ones of which are mutually independently movable along the pressing direction. Hence, even if one of the stone portions runs on the subject surface so as to move in the opposite direction to the pressing direction, the other stone portion is free to move independently of the above one stone portion, so as to be capable of maintaining the state pressed against the subject surface. Accordingly, a part of the subject surface that is in contact with the other stone portion may be superfinished. On the other hand, if the vibrated superfinishing stone causes the other stone portion to run on the subject surface, only the other stone portion moves in the opposite direction to the pressing direction whereas the one stone portion is maintained in the state pressed against subject surface. As a result, a part of the subject surface that is in contact with the one stone portion may be superfinished. The plural stone portions are alternately slid on the subject surface in this manner, whereby the overall subject surface may be uniformly superfinished. In this process, the subject surface is free from a portion making no contact with the superfinishing stone or a portion failing to achieve an adequate contact with the superfinishing stone, because the superfinishing stone is divided by the split surface inclined to both the directions in which the superfinishing stone is slid on the subject surface and in which the superfinishing stone is vibrated thereon. Accordingly, the subject surface does not suffer the formation of a step or linear projection at place corresponding to a junction between the stone portions. A portion of the subject surface that corresponds to a boundary between adjoining stone portions makes contact with both of the stone portions so that the subject surface may be finished in a smooth surface free from the step or the like, the formation of which resulting from stone differences. Therefore, the plural stone portions are not required to have the same quality but may have different qualities according to use. In a case where a raceway surface of an inner ring of a tapered roller bearing is superfinished, for example, a stone portion corresponding to a greater diameter portion of the inner ring may have a higher hardness than that of a stone portion corresponding to a smaller diameter portion, such that the stone portion making contact with the greater diameter portion rotated at a higher circumferential speed may have service life as long as that of the stone portion making contact with the smaller diameter portion rotated at a lower circumferential speed.

The superfinishing stone may includes a first abrasive stone portion having a projection for working one end portion of a crown surface, and a second abrasive stone portion having a projection for working the other end portion of the crown surface. In this case, if the projection of the first abrasive stone portion runs on the flat face of the crown surface, the second abrasive stone portion is free to move independently of such a first abrasive surface portion, thus maintaining the state pressed against the crown surface. Therefore, the second stone portion is capable of superfinishing a portion of the crown surface that includes the other end portion thereof and is in contact with the second stone portion. On the other hand, if the vibrated superfinishing stone causes the projection of the second stone portion runs on the flat face of the crown surface, the first stone portion is maintained in the state pressed against the crown surface, so that a portion of the crown surface that is in contact with the first stone portion is superfinished. The uniform superfinishing of the overall crown surface may be achieved in this manner.

It is preferred that a gap for supplying a working fluid is provided between adjoining stone portions. The constitution is adapted to supply the working fluid, such as a grinding fluid, to the subject surface via the gap, thereby ensuring that a central area of the subject surface is also supplied with an adequate working fluid. Thus, the subject surface may be improved in cleanability and lubricability. As a result, the polishing process by way of the superfinishing stone may achieve increased accuracies.

It is preferred that the plural stone portions include at least two types of superfinishing stones having different qualities. In this case, the aforementioned effect may be obtained. That is, the constitution may offer the following effect. In the case where the inner-ring raceway surface of the tapered roller bearing is superfinished, for example, the stone portion corresponding to the greater diameter portion of the inner ring may have the higher hardness than that of the stone portion corresponding to the smaller diameter portion, such that the stone portion making contact with the greater diameter portion rotated at the higher circumferential speed may have service life as long as that of the stone portion making contact with the smaller diameter portion rotated at the lower circumferential speed.

According to the invention, there is further provided a superfinishing process for superfinishing a subject surface by using the superfinishing stone according to Claim 1, including:

a step of moving a work having the subject surface relative to the superfinishing stone;

a step of pressing the superfinishing stone against the subject surface and sliding the superfinishing stone on the subject surface; and a step of vibrating the superfinishing stone in a different direction from the sliding direction, and characterized in that the individual ones of the plural stone portions constituting the superfinishing stone are mutually independently moved in the pressing direction depending on the height variations of the subject surface.

A superfinishing process for superfinishing a curved surface by using the superfinishing stone according to Claim 2, includes:

a step of moving a work having the curved surface relative to the superfinishing stone;

a step of pressing the superfinishing stone against the curved surface and sliding the superfinishing stone on the curved surface; and a step of vibrating the superfinishing stone in a different direction from the sliding direction, and is characterized in that the individual ones of the plural stone portions constituting the superfinishing stone are mutually independently moved in the pressing direction depending on the height variations of the curved surface.

The process of the invention adopts the superfinishing stone including the plural stone portions as the superfinishing stone pressed against the subject surface. What is more, the individual ones of the stone portions are mutually independently movable along the pressing direction. Therefore, if one of the stone portions runs on the subject surface so as to be moved in the opposite direction to the pressing direction, the other stone portion is free to move independently of such one stone portion, thus maintaining the state pressed against the subject surface. Therefore, a part of the subject surface that is in contact with the other stone portion may be superfinished. On the other hand, if the vibrated superfinishing stone causes the other stone portion to run on the subject surface, only the other stone portion is moved in the opposite direction to the pressing direction whereas the one stone portion is maintained in the state pressed against the subject surface. As a result, a part of the subject surface that is in contact with the one stone portion may be superfinished. In this manner, the plural stone portions are alternately slid on the subject surface, whereby the overall subject surface may be uniformly superfinished. In this process, the subject surface is free from the portion making no contact with the superfinishing stone or the portion failing to make an adequate contact with the superfinishing stone, because the superfinishing stone is divided by the split surface inclined to both the directions in which the superfinishing stone is slid on the subject surface and in which the superfinishing stone is vibrated thereon. Accordingly, the subject surface does not suffer the formation of the step or linear projection at place corresponding to the junction between the stone portions. The portion of the subject surface that corresponds to the boundary between adjoining stone portions makes contact with both of the stone portions so that the subject surface may be finished in the smooth surface free from the step or the like, the formation of which resulting from stone differences. Therefore, the plural stone portions are not required to have the same quality but may have different qualities according to use. In a case where the raceway surface of the inner ring of the tapered roller bearing is superfinished, for example, the stone portion corresponding to the greater diameter portion of the inner ring may have a higher hardness than that of the stone portion corresponding to the smaller diameter portion, such that the stone portion making contact with the greater diameter portion rotated at a higher circumferential speed may have service life as long as that of the stone portion making contact with the smaller diameter portion rotated at a lower circumferential speed.

It is preferred that the superfinishing process further includes a step of supplying a working fluid through a gap between adjoining stone portions. The process is adapted to supply the working fluid, such as the grinding fluid, to the subject surface via the gap, thereby ensuring that the central area of the subject surface is also supplied with the adequate working fluid. Thus, the subject surface may be improved in cleanability and lubricability. As a result, the polishing process by way of the superfinishing stone may achieve the increased accuracies.

BEST MODE FOR CARRYING OUT THE INVENTION

A superfinishing stone and a superfinishing process using the same according to an embodiment of the invention will hereinbelow be described with reference to the accompanying drawings.

Figure 1:
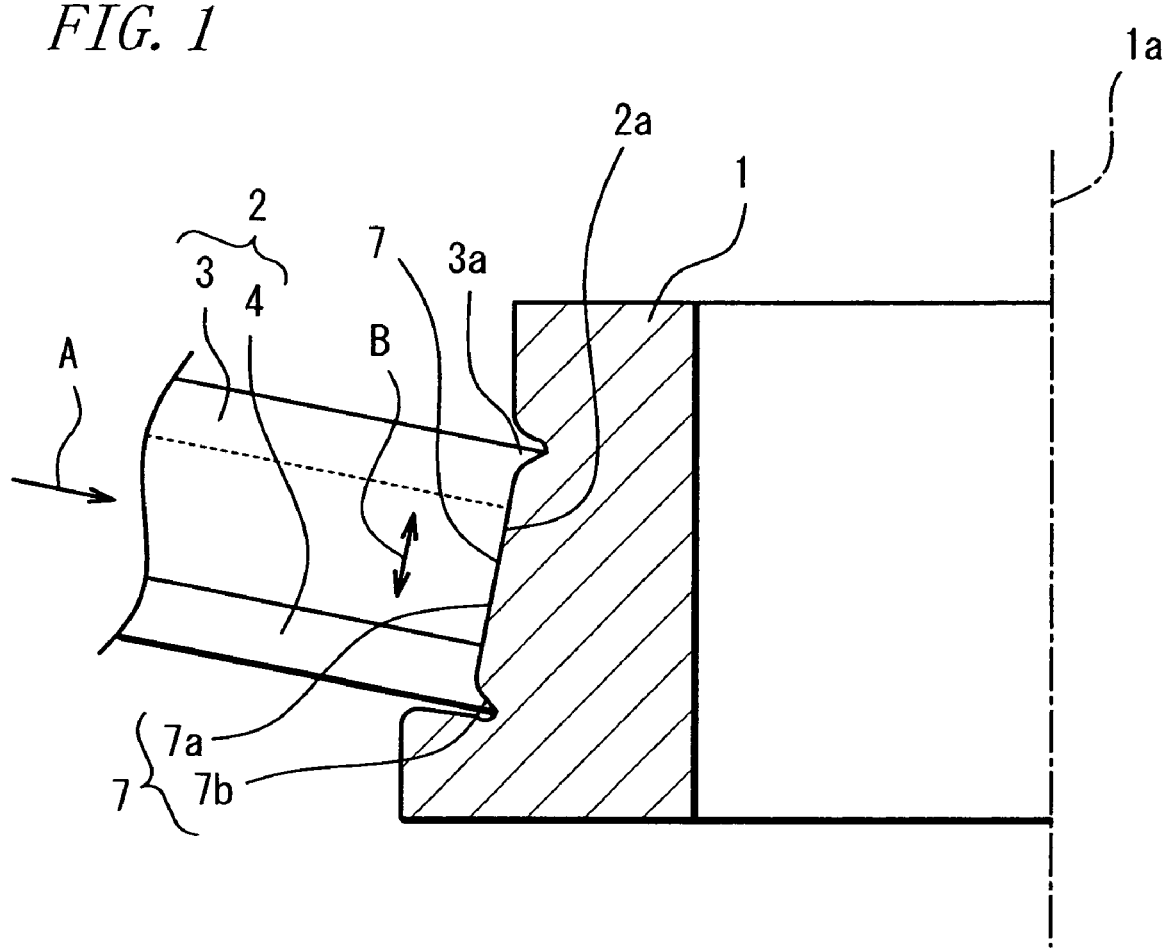
FIG. 1 is a sectional view illustrating a superfinishing stone according to one embodiment of the invention.
Figure 2:
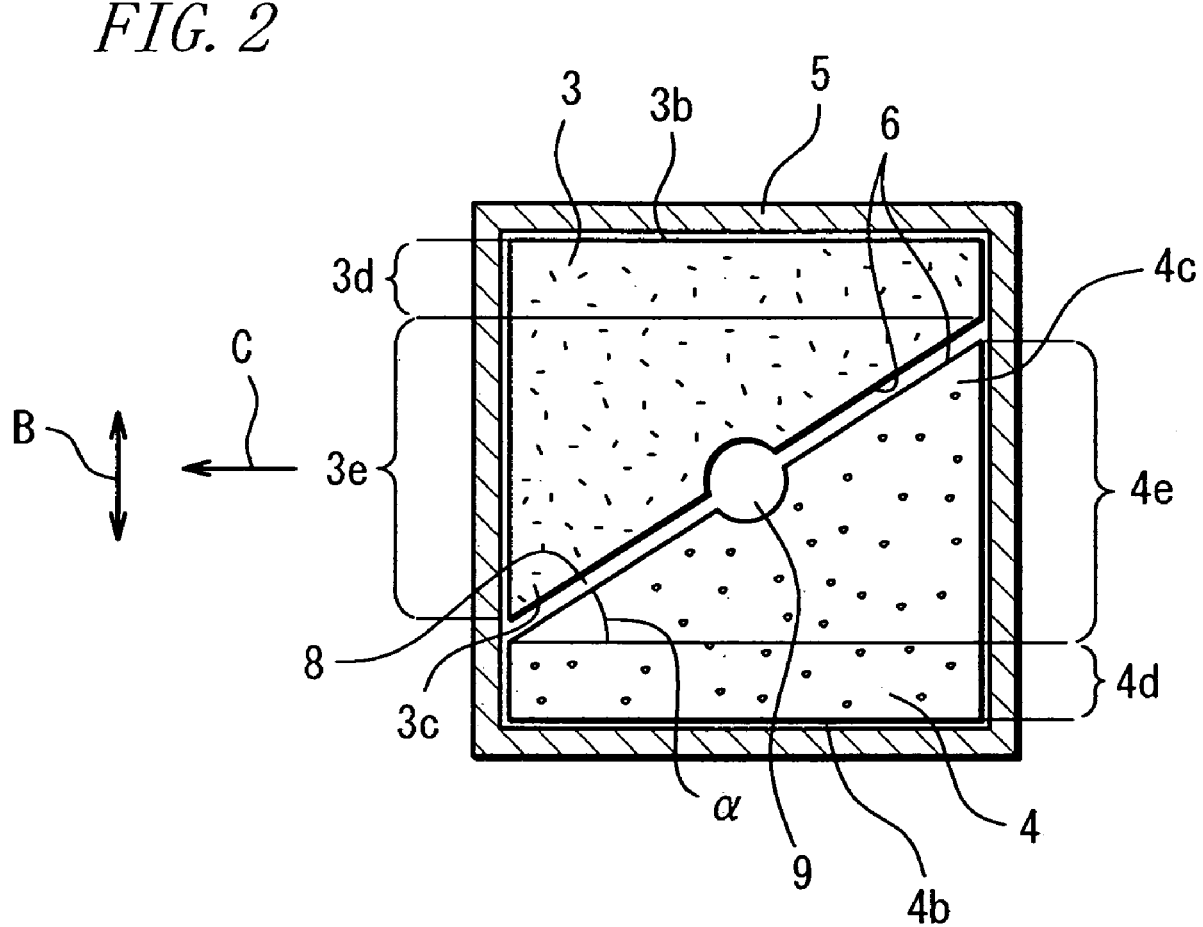
FIG. 2 is a transversal sectional view illustrating the superfinishing stone shown in FIG. 1.
Figure 3:
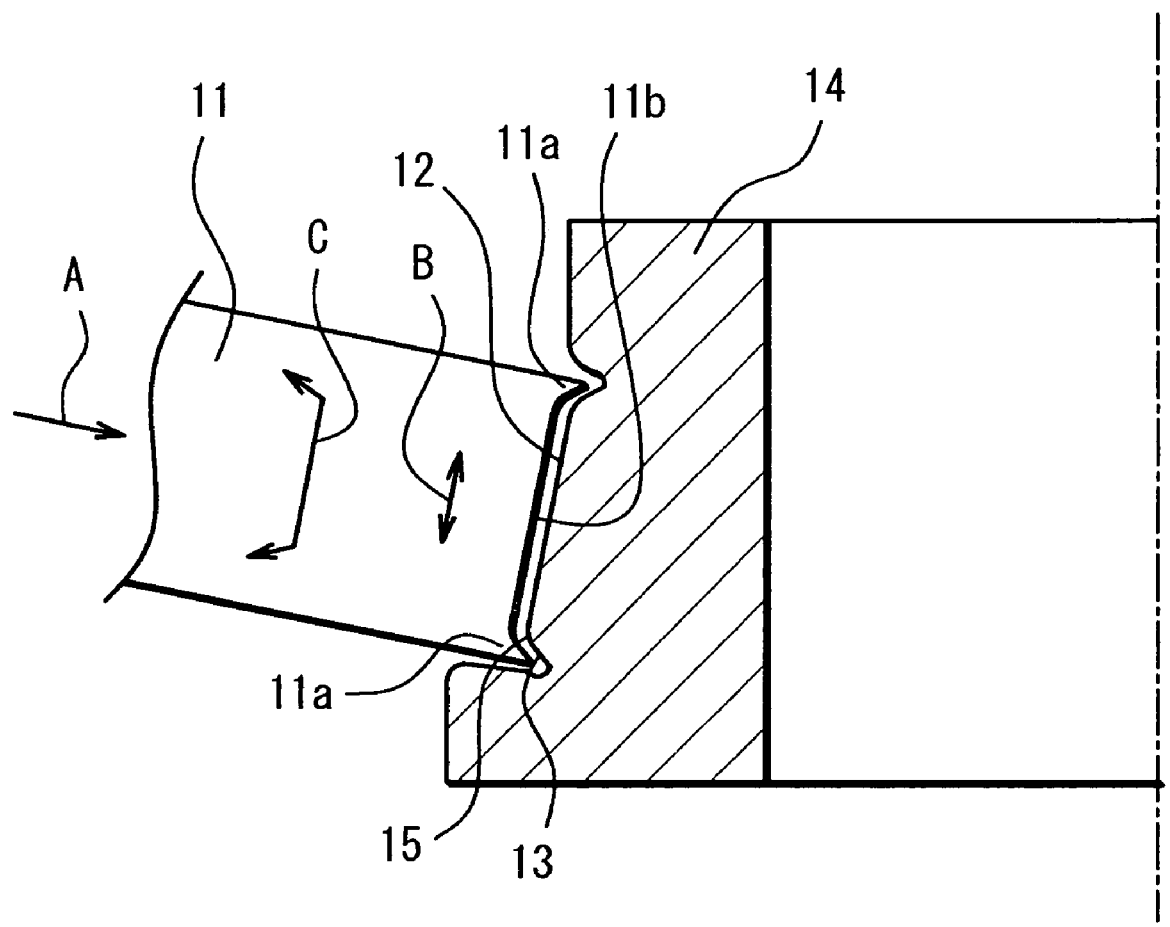
FIG. 3 is a sectional view illustrating a conventional superfinishing stone.
Figure 4:
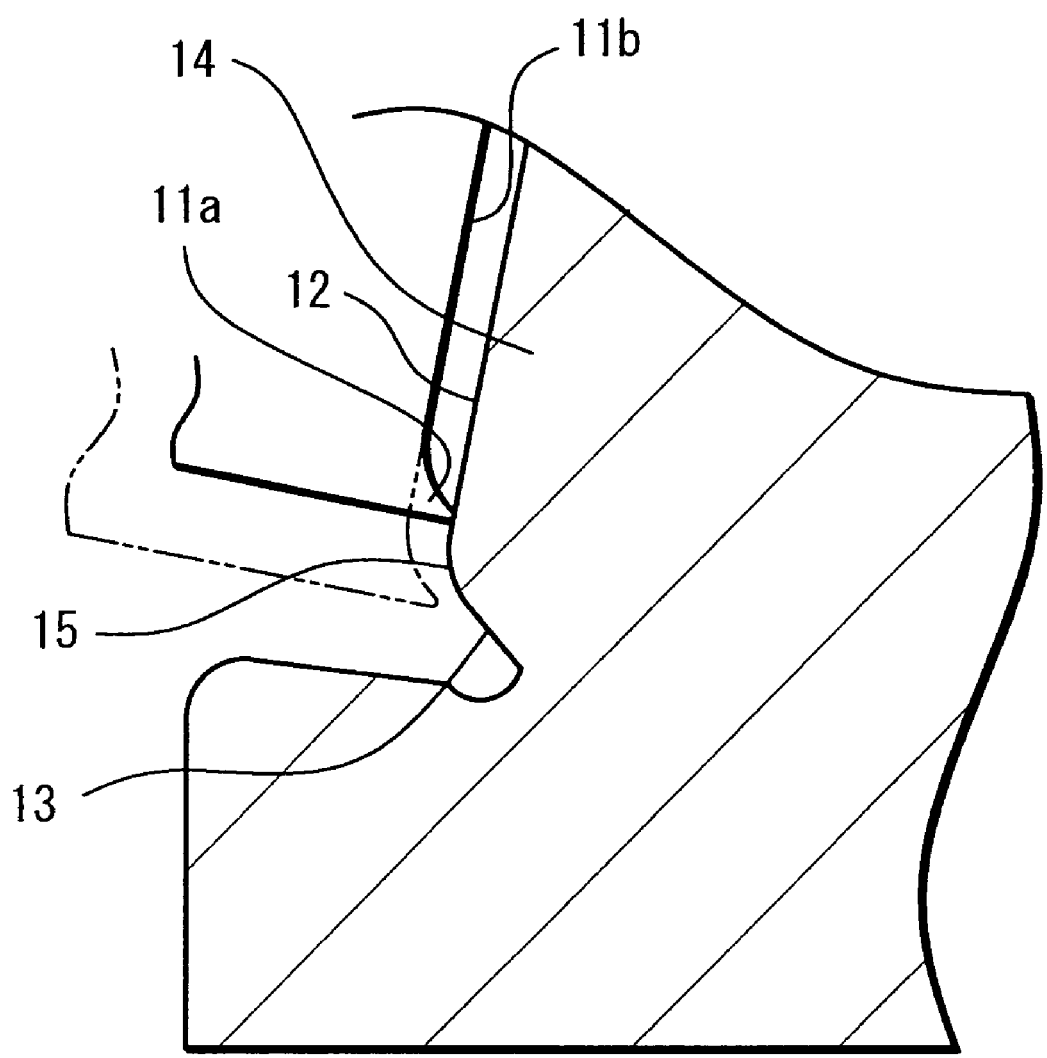
FIG. 4 is a fragmentary enlarged view of the superfinishing stone shown in FIG. 3.

FIG. 1 is a sectional view illustrating a superfinishing stone according to one embodiment of the invention. FIG. 2 is a transversal sectional view (cross-section orthogonal to a longitudinal direction) of the superfinishing stone shown in FIG. 1. In FIG. 1 and FIG. 2 as well as in FIG. 3 and FIG. 4 illustrating the prior art, a crowning configuration or more particularly, the depth of the crowning configuration and projections at opposite ends of the superfinishing stone in correspondence to the opposite ends of the crowning configuration are exaggeratingly depicted for sake of clarity. FIG. 1 and FIG. 3 omits the illustration of a holder accommodating the superfinishing stone.

FIG. 1 shows a case where a raceway surface on an outer peripheral surface of an inner ring of a tapered roller bearing is superfinished. An inner ring 1 as a work is rotated about its axis 1$a$ by means of an unillustrated rotary mechanism (relatively moved to a superfinishing stone). A superfinishing stone 2 is pressed against a raceway surface 7 (subject surface) on an outer peripheral surface of the inner ring 1 in a direction of Arrow A. Thus, an abrasive surface 2$a$ at a tip of the superfinishing stone 2 is slid on the raceway surface 7. The pressing of the superfinishing stone may be accomplished by means of a fluid pressure operated cylinder conventionally used in the art, such as hydraulic cylinder or air cylinder, or elastic means such as spring. The superfinishing stone 1 along with a pressing mechanism such as the air cylinder are also brought into vibrations (oscillations) in a different direction (see Arrow B) from the sliding direction by means of an unillustrated vibrating mechanism, so that the finishing stone is vibrated as slid on the raceway surface 7. Thus, the raceway surface 7 is superfinished.

The superfinishing stone 2 includes two stone portions, which include a first abrasive stone portion 3 disposed in correspondence to a smaller diameter portion of the inner ring 1; and a second abrasive stone portion 4 disposed in correspondence to a greater diameter portion thereof. The first stone portion 3 and the second stone portion 4 are both formed of bar-like grindstone. Both the stone portions have a trapezoidal cross-section perpendicular to a longitudinal direction thereof (the pressing or depressing direction). While the stone portions 3, 4 according to the embodiment have the cross-sections of the same shape, the cross-sections may be of different shapes. The stone portions 3, 4 are movably disposed (movable in a direction perpendicular to the drawing surface of FIG. 2) in a holder 5 formed from a hardened steel or the like. Each of the stone portions has its proximal end face connected to the pressing mechanism such as the air cylinder. This permits the individual stone portions 3, 4 to be mutually independently moved in the pressing or depressing direction. The pressing mechanisms for the respective stone portions are fixed to a common support base, which is vibrated by the vibrating mechanism. While the embodiment is constituted such that the two stone portions are disposed in a single holder, the stone portions may also be disposed in discrete holders. In this case, the holders may be fixed to discrete support bases, which may be vibrated by discrete vibrating mechanisms.

A projection 3$a$ for working one end portion (end portion on the diametrically smaller side of the inner ring) of the inner-ring raceway surface 7 as a crown surface is formed along an edge 3$b$ of the first stone portion 3 on the diametrically smaller side of the inner ring. On the other hand, a projection 4$a$ for working the other end portion (end portion on the diametrically greater side of the inner ring) of the inner-ring raceway surface 7 is formed along an edge 4$b$ of the second stone portion 4 on the diametrically greater side of the inner ring. Each of the stone portions includes a rectangular portion 3$d$, 4$d$; and a tapered portion 3$e$, 4$e$. The tapered portions 3$e$, 4$e$ are mainly responsible for adjusting the machining allowance and surface texture of the raceway surface 7, whereas the rectangular portions 3$d$, 4$d$ are mainly responsible for adjusting the crowning configuration.

Each of the first stone portion 3 and the second stone portion 4 has a split surface 6 inclined to both the direction in which the superfinishing stone 2 is slid on the raceway surface 7 as the subject surface (arrow C in FIG. 2) and the vibrating direction B. A gap 8 on the order of 0 to 2 mm is defined between the stone portions 3, 4. The split surfaces 6 of the stone portions are formed with grooves at places in opposing relation, the grooves substantially having a semi-circular shape in section. The pair of grooves jointly form a passage 9 such that a working fluid may be supplied to the raceway surface 7 through the passage 9 and the gap 8.

As described above, the superfinishing stone 2 is constituted by the plural stone portions 3, 4 which are adapted to move independently of each other, so that the superfinishing stone 2 can uniformly superfinish the overall raceway surface 7. Even if the projection 3$a$ of the first stone portion 3 runs on the raceway surface 7 so that the first stone portion 3 is moved in the opposite direction to the pressing direction while the superfinishing stone 2 is vibrated as being slid on the raceway surface 7, for example, the second stone portion 4 is movable independently of the first stone portion 3. Accordingly, the second stone portion 4 is capable of maintaining the state pressed against the raceway surface 7. Therefore, a part of the raceway surface 7 that is in contact with the second stone portion 4 (the raceway surface 7 including not only a flat face 7$a$ but also a CR deep surface 7$b$ continuous to the flat face 7a) may be superfinished. On the other hand, if the vibrated superfinishing stone 2 causes the second stone portion 4 to run on the raceway surface 7, only the second stone portion 4 is moved in the opposite direction to the pressing direction so that the first stone portion 3 is maintained in the state pressed against the raceway surface 7. As a result, a part of the raceway surface 7 that is in contact with the first stone portion 3 may be superfinished. In this manner, both the stone portions 3, 4 are alternately slid on the raceway surface 7, whereby the overall raceway surface 7 may be superfinished. In this process, the raceway surface 7 is free from a portion making no contact with the abrasive surface 2a of the superfinishing stone 2 or a portion failing to make an adequate contact with the abrasive surface 2a because the superfinishing stone 2 is divided by way of the split surfaces 6 inclined to both the directions in which the superfinishing stone 2 is slid on the raceway surface 7 and in which the superfinishing stone is vibrated thereon. Accordingly, the raceway surface 7 does not suffer the formation of a step or linear projection at place corresponding to a junction between the stone portions 3, 4.

An angle α at which the split surface 6 inclines to the sliding direction C is not particularly limited by the invention. A suitable angle may be selected in view of the prevention of the aforementioned step or linear projection; the dimension of the gap between the stone portions 3, 4; the strength of the stone portion at an acute angle portion 3c, 4c formed by the inclined split surface; and the like. However, the angle is normally on the order of 10 to 40°.

The embodiment is adapted to supply the working fluid to the raceway surface 7 via the passage 9 and the gap 8 defined between the stone portions 3, 4 during the superfinishing process, so that the working fluid may be assuredly supplied to a central area of the raceway surface 7, as well. Thus, the raceway surface 7 may be improved in cleanability and lubricability. As a result, the polishing process by way of the finishing stone may achieve increased accuracies.

The superfinishing stone 2 is divided by the split surface 6 inclined to both the directions in which the superfinishing stone 2 is slid on the raceway surface and in which the superfinishing stone is vibrated thereon. Hence, a part of the raceway surface 7 that corresponds to a boundary between the stone portions 3, 4 is brought into contact with both of the stone portions, so that the raceway surface may be finished in a smooth surface free from the step or the like, the formation of which results from stone differences. Therefore, these stone portions 3, 4 are not required to have the same quality but may have different qualities (exemplified by abrasive grain material, mesh size, grain size, the type of binder and such) according to use. In a case where a raceway surface of an inner ring of a tapered roller bearing is superfinished, for example, the stone portion corresponding to the greater diameter portion of the inner ring may have a higher hardness than that of the stone portion corresponding to the smaller diameter portion, such that the stone portion making contact with the greater diameter portion rotated at a higher circumferential speed may have service life as long as that of the stone portion making contact with the smaller diameter portion rotated at a lower circumferential speed.

Next, description is made on a superfinishing process using the aforementioned superfinishing stone.

First, the inner ring 1 as a work is fixed to a jig connected to the rotary mechanism, which is driven to rotate the inner ring 1 about its axis. Subsequently, the superfinishing stone 2 is advanced from a retreat position so as to present the abrasive surface 2a at its tip against the raceway surface 7 of the inner ring 1 and to allow the abrasive surface to slide on the raceway surface 7. In this process, the pressing mechanism such as the air cylinder is so controlled as to apply a predetermined pressing force for bringing the abrasive surface 2a of the superfinishing stone 2 into contact against the raceway surface 7. After the superfinishing stone 2 makes contact against the raceway surface 7 of the inner ring 1, the superfinishing stone 2 is vibrated in the different direction from the sliding direction, whereby the raceway surface 7 may be superfinished. Further, the individual ones of the plural stone portions constituting the superfinishing stone 2 are mutually independently movable in the pressing direction according to the height variations of the raceway surface 7. Therefore, the overall raceway surface 7 may be uniformly superfinished, as described in conjunction with the superfinishing stone 2.

While the embodiment employs two stone portions, three or more stone portions may also be employed. In this case, all the superfinishing stones constituting the plural stone portions may have the same quality. Otherwise, the plural stone portions may include at least two types of superfinishing stones having different qualities. Specifically, in a case where the number of stone portions is three, all the three stone portions may have the same quality or may individually have different qualities. An alternative constitution may also be made such that two of the three stone portions are constituted by superfinishing stones having the same quality, while the remaining stone portion is constituted by a superfinishing stone having a different quality from that of the two stone portions.

While the foregoing description is made by way of example where the tapered roller bearing is the work and the raceway surface of the inner ring is the subject surface, the invention is not limited to this. The subject surface may be an outer ring or a roller. The invention is also applicable to the components of rolling bearings other than the tapered roller bearing. The invention may also be applied to processes of superfinishing the other devices than the bearings, which are exemplified by rollers, disks, shaft bodies, spherical bodies and the like.

The invention claimed is:

1. A superfinishing stone designed to be pressed against a subject surface and slid on the subject surface as relatively moved thereon and to be vibrated on the subject surface in a different direction from a sliding direction,
    wherein the superfinishing stone comprises a plurality of stone portions, each of the stone portions has a split surface inclined to both the sliding direction and a vibrating direction, the split surfaces of two immediately adjacent stone portions face each other, and the stone portions are mutually independently movable along the split surfaces and in the pressing direction, and
    wherein a groove is recessed at each of the split surfaces and extends along the pressing direction, and the grooves of the two immediately adjacent stone portions face each other and jointly form a passage such that a working fluid is supplied to the subject surface through the passage.

2. A superfinishing stone for curved-surface working having an abrasive surface which is vibrated along a curved surface as pressed thereagainst and which is movable in a pressing direction according height variations of the curved surface,
    wherein the superfinishing stone comprises a combination of plural stone portions, each of the stone portions has a split surface inclined to a vibrating direction and are movable along the split surface and in a pressing direction, and the split surfaces of two immediately adjacent stone portions face each other, wherein the individual ones of the plural stone portions are mutually independently free to move, and wherein a groove is recessed at each of the split surfaces and extends along the pressing direction, and the grooves of the two immediately adjacent stone portions face each other and jointly form a passage such that a working fluid is supplied to the curved surface through the passage.

3. The superfinishing stone according to claim 1, wherein the superfinishing stone comprises a first abrasive stone portion having a projection for working one end portion of a crown surface, and a second abrasive stone portion having a projection for working the other end portion of the crown surface.

4. The superfinishing stone according to claim 2, wherein the superfinishing stone comprises a first abrasive stone portion having a projection for working one end portion of a crown surface, and a second abrasive stone portion having a projection for working the other end portion of the crown surface.

5. The superfinishing stone according to claim 1, wherein a gap for supplying the working fluid is provided between the two immediately adjacent stone portions.

6. The superfinishing stone according to claim 2, wherein a gap for supplying the working fluid is provided between the two immediately adjacent stone portions.

7. The superfinishing stone according to claim 3, wherein a gap for supplying the working fluid is provided between the two immediately adjacent stone portions.

8. The superfinishing stone according to claim 4, wherein a gap for supplying the working fluid is provided between the two immediately adjacent stone portions.

9. The superfinishing stone according to claim 1, wherein the plural stone portions include at least two types of superfinishing stones having different qualities.

10. The superfinishing stone according to claim 2, wherein the plural stone portions include at least two types of superfinishing stones having different qualities.

11. The superfinishing stone according to claim 3, wherein the plural stone portions include at least two types of superfinishing stones having different qualities.

12. The superfinishing stone according to claim 4, wherein the plural stone portions include at least two types of superfinishing stones having different qualities.

13. The superfinishing stone according to claim 5, wherein the plural stone portions include at least two types of superfinishing stones having different qualities.

14. The superfinishing stone according to claim 6, wherein the plural stone portions include at least two types of superfinishing stones having different qualities.

15. The superfinishing stone according to claim 7, wherein the plural stone portions include at least two types of superfinishing stones having different qualities.

16. The superfinishing stone according to claim 8, wherein the plural stone portions include at least two types of superfinishing stones having different qualities.

17. A superfinishing process for superfinishing the subject surface by using the superfinishing stone according to claim 1, comprising:

a step of moving a work having the subject surface relative to the superfinishing stone;

a step of pressing the superfinishing stone against the subject surface and sliding the superfinishing stone on the subject surface; and a step of vibrating the superfinishing stone in a different direction from the sliding direction, wherein the individual ones of the plural stone portions constituting the superfinishing stone are mutually independently moved in the pressing direction depending on the height variations of the subject surface.

18. A superfinishing process for superfinishing the curved surface by using the superfinishing stone according to claim 2, comprising:

a step of moving a work having the curved surface relative to the superfinishing stone;

a step of pressing the superfinishing stone against the curved surface and sliding the superfinishing stone on the curved surface; and a step of vibrating the superfinishing stone in a different direction from the sliding direction, wherein the individual ones of the plural stone portions constituting the superfinishing stone are mutually independently moved in the pressing direction depending on the height variations of the curved surface.

19. The superfinishing according to claim 18, further comprising a step of supplying the working fluid through a gap between the two immediately adjacent stone portions.

20. The superfinishing process according to claim 19, further comprising a step of supplying the working fluid through a gap between the two immediately adjacent stone portions.

* * * * *